Dec. 12, 1950 L. T. AKELEY 2,534,097
TOP BURNER ELECTRIC RANGE AUTOMATIC COOKING
Filed June 3, 1948 2 Sheets-Sheet 1
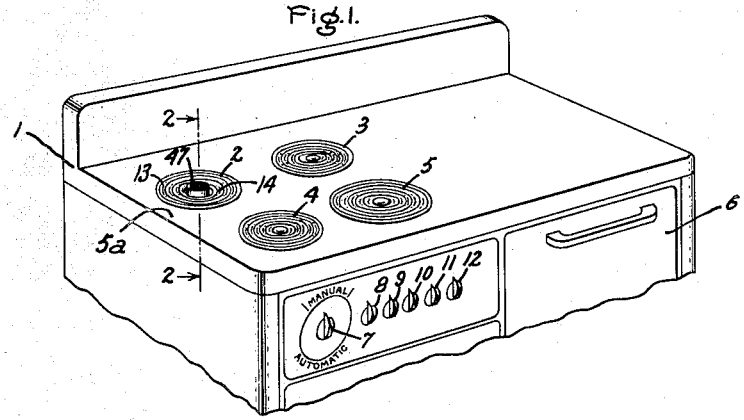
Fig.1.
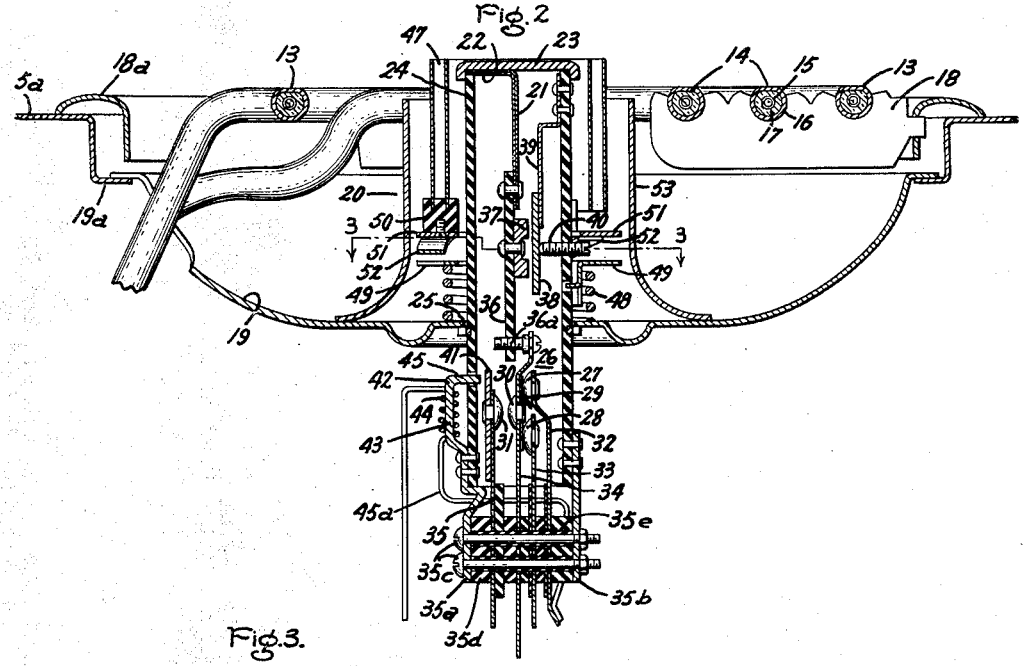
Fig.2.
Fig.3.
Inventor:
Lloyd T. Akeley.
by Alfred V. Robert
His Attorney.

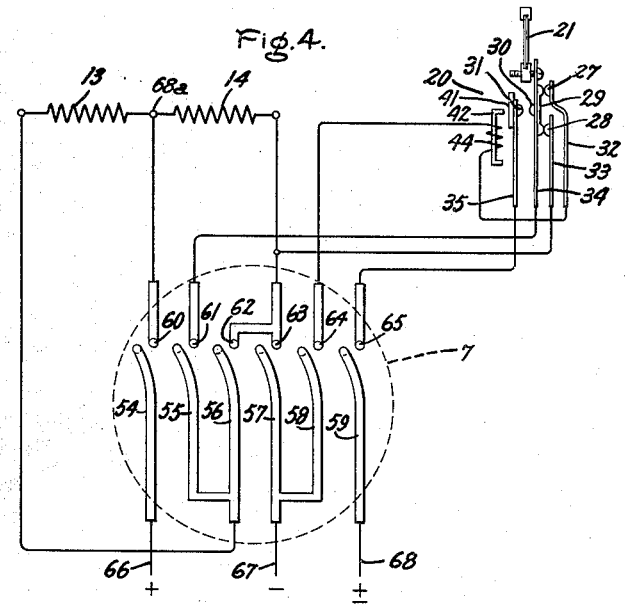
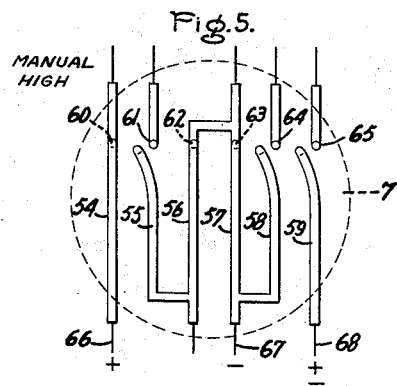
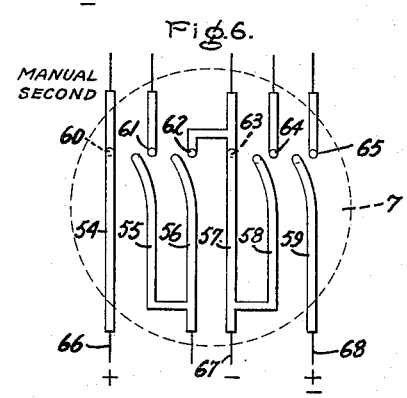
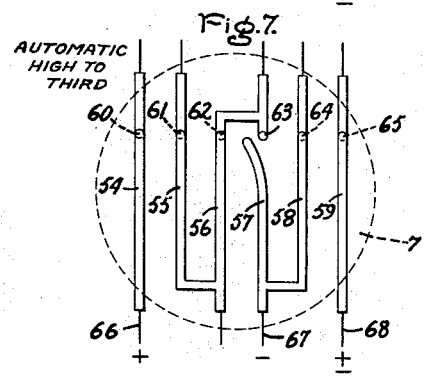
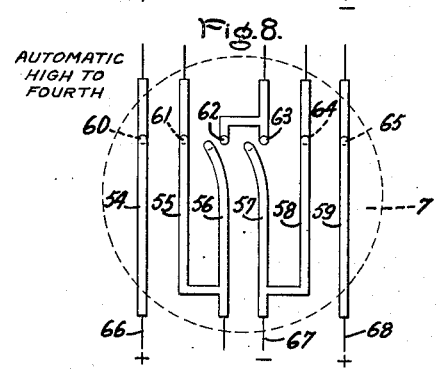
Inventor:
Lloyd T. Akeley
by Alfred E. Bobst
His Attorney.

Patented Dec. 12, 1950

2,534,097

UNITED STATES PATENT OFFICE 2,534,097

TOP BURNER ELECTRIC RANGE AUTOMATIC COOKING

Lloyd T. Akeley, Lynn, Mass., assignor to General Electric Company, a corporation of New York Application June 3, 1948, Serial No. 30,835

3 Claims. (Cl. 219—37)

1

This invention relates to electric hotplates for electric ranges and the like, and it has for its object the provision of an inexpensive and simple apparatus of this character which for certain cooking operations automatically will reduce the heat from a high initial value which rapidly brings the food to the cooking temperature, to a lower cooking value which maintains the cooking temperature.

More specifically, this invention contemplates an improved hotplate having at least a pair of heating elements; and temperature control means for the heating elements which functions responsively to the temperature of the cooking vessel on the hotplate to operate the heating elements first to deliver their maximum heat quickly to bring the cooking vessel to the cooking temperature and then automatically to reduce their heat delivery so as to maintain the cooking temperature. A selector switch is included in the hotplate system to preselect the lower cooking heat. The temperature control means is in the form of a heat transfer switch which coacts directly and only with the selector switch to effect the initial maximum heat delivery and then, upon the vessel attaining the cooking temperature, to effect the lower cooking heat.

The control system and certain portions of the switching apparatus in the hotplate disclosed here have been made the subjects of divisional applications, Serial No. 116,877 and Serial No. 116,878, both filed September 21, 1949 and assigned to the same assignee as the present application. The instant application will be directed toward the thermostatic switch operator and shielding structures in the hotplate, as later explained and claimed.

For a more complete understanding of this invention, reference should be had to the accompanying drawings in which Fig. 1 is a fragmentary perspective view of an electric range provided with a hotplate embodying this invention; Fig. 2 is a central vertical sectional view of a hotplate embodying this invention, the figure being drawn on a larger scale than in Fig. 1; Fig. 3 is a sectional view taken through the line 3—3 of Fig. 2 and looking in the direction of the arrows; and Figs. 4, 5, 6, 7 and 8 are diagrammatic representations of the heating system and switch means therefor, arranged in accordance with this invention.

Referring to the drawings, this invention has been shown in one form as applied to an electric range 1 comprising four surface heating units 2, 3, 4 and 5, mounted in the top cooking surface

2

5a of the range, and also an oven 6 located beneath the top surface 5a. The surface heating units 2 to 5, inclusive, are controlled by means of rotary selector switches 7, 8, 9 and 10, respectively, while the oven 6 is controlled by a selector switch 11 and the oven temperature is controlled and set by a thermostat 12. Each of the surface units 3, 4 and 5 has a pair of heating elements which, by means of its respective switch 8, 9 and 10 is connected in various circuit relations to a three-wire supply source so as to provide a number of different degrees of heat generation. The oven switch 11 controls the oven heating units (not shown) to provide "bake" and "broil" heats.

The heating unit 2 is controlled in accordance with this invention, to generate a high degree of heat initially and then, after the cooking vessel placed upon the hotplate has attained a predetermined cooking temperature, is automatically controlled to generate a lower cooking heat which is selected by the switch 7. Moreover, it is contemplated that for automatic operation the switch 7 will be adjusted to the desired cooking heat position, but in any such case the initial heat generated will be that attained by operating the unit 2 to its maximum wattage, and only when the cooking temperature has been attained will the automatic control cause the heating unit 2 to generate the lower selected cooking wattage.

As shown more clearly in Figs. 1 and 2, the heating unit 2 comprises a pair of heat generating elements 13 and 14. The element 13 is in the form of a ring, while the element 14 is spirally wound and lies within the ring element 13. The two heating elements 13 and 14 have their upper surfaces lying in a horizontal cooking plane and preferably these surfaces will be flattened somewhat as shown in Fig. 2. It will be understood that the cooking vessel will be supported directly by these flattened surfaces in the cooking plane. Also, it will be observed that the cooking plane is elevated somewhat with respect to the top surface 5a. The two heating elements 13 and 14 preferably will be of the sheathed type, each comprising a helical resistance conductor 15 housed within a tubular metallic sheath 16 and embedded in and held in spaced relation with reference to this sheath by a compact mass of electrically insulating and heat conducting material 17, such as powdered magnesium oxide. The elements 13 and 14 are supported in a grid-like spider 18 which, in turn, is mounted in a ring 18a which supports the grid and heating elements from the top surface 5a, as shown. Under the elements 13 and 14 is a bowl-shaped metallic reflector pan 19 which is supported by means of a flange 19a attached to the top surface 5a.

Mounted in the central area of the heating unit is a temperature responsive control element 20. This element comprises a temperature responsive element 21 in the form of a bimetallic bar; this bar is formed of two metals having dissimilar coefficients of expansion and secured together lengthwise from end to end. The upper end 22 of the bar is formed at right angles to the main body of the bar and this portion is secured to a cap 23, formed of a good heat conducting material such as copper or aluminum; the section 22 is secured to the cap 23 in any suitable fashion, as by brazing. The thermostatic bar 21 is so arranged that when it is cool, that is, at room temperature, it occupies its position shown in Fig. 2, whereas, when it is heated it tends to move toward the left, that is, clockwise, as viewed in this figure.

The cap 23 is supported on and closes the upper end of a heat insulating cylindrical tube 24 mounted vertically with its central axis substantially coincident with the central vertical axis of unit 2, and which tube is formed of any suitable heat insulating material such as a glass filled phenol condensation product. The tube extends downwardly through a central aperture 25 formed in the bottom wall of the reflector 19, as shown.

The thermostat bar 21 functions to operate a transfer switching mechanism 26 mounted in the lower end of the tube 24 to effect the automatic high to low heat delivery heretofore referred to. This switching mechanism comprises a pair of vertically spaced contacts 27 and 28 which coact with a bridging contact 29; and a contact 30 which coacts with a companion contact 31. Contacts 27 and 28 are mounted on electrically conducting spring contact arms 32 and 33 respectively; bridging contact 29 is mounted on the right side of an electrically conducting spring contact arm 34, while contact 30 is mounted on the opposite side of this arm 34; and contact 31 is mounted on the right side of an electrically conducting spring contact arm 35; all as clearly shown in Fig. 2. The resiliency of the arms 32, 33 and 34 are such that they bias bridging contact 29 into engagement with contacts 27 and 28; and normally at room temperature the thermostatic element 21 is in its position as shown to maintain bridging contact 29 in contact with contacts 27 and 28. The lower ends of switch arms 32, 33, 34 and 35 are secured to two rigid metallic arms 35a and 35b which at their upper ends are secured to the lower end of the tube 24 by rivets as shown, and to which the contact arms are secured by means of bolts 35c. The switch arms are electrically insulated from each other and from the metallic arms 35a and 35b by means of insulating washers 35d and tubes 35e, the latter surrounding the bolts 35c, as shown.

The thermostatic bar 21 is connected to the switch mechanism by means of an electrically insulating bar 36 formed of any suitable electrical insulating and heat resisting material such as a phenol condensation product. The upper end of this bar is secured to the lower end of the bimetal bar by means of a rivet, while its lower end is secured to the upper end of the switch arm 34, which projects upwardly beyond the upper ends of the remaining switch arms, by means of a screw 36a.

The insulating bar 36 carries intermediate its ends a permanent magnet 37 which coacts with an armature 38. Armature 38 is mounted on the lower end of a spring arm 39, the upper end of which is fixed to the upper end of the tube 24 by means of rivets, as shown. Spring arm 39 biases the armature 38 toward the right against an adjustable stop 40 threaded in the tube for adjustment. The magnet and armature bias the bar 36 and hence, the connecting switch arm 34 toward the right.

Switch arm 35 also carries an armature 41 on its left side which coacts with an electromagnetic element 42 having a core 43 which conveniently may be formed as an upper extension on the switch assembly arm 35a, and the electromagnet also has a coil 44 which surrounds the core. The core and its coil, as shown, are mounted outside of the tube 24, but the upper end of the core 45 is directed inwardly and projects through an opening provided for it in the tube; the lower end of the core also is directed inwardly toward the tube, but it is secured to the outside of the tube by means of the rivets fastening the arm 35a to the tube and which rivets extend through the tube. The upper end 45 of the core and the inner heads of the rivets form the two poles of the electromagnet 42 and they coact with the armature 41 to move it toward the left (Fig. 2) when the coil 44 is energized. The lower end of the coil 44 is permanently connected electrically to contact arm 32 by means of a jumper 45a.

I refer now to important portions of my invention which, together with certain other cooperating structures, are claimed in the present application.

The heating unit 2 further comprises a shield 47 consisting of two concentric cylindrical shells formed of heat reflecting material and positioned around the upper end of tube 24 in concentric relation with it and with each other and about the zone of the tube housing the bimetallic bar 21. These shells 47 as well as the cylinder 24 function to prevent radiant heat of the heating elements 13 and 14 from gaining access to the bimetallic bar 21.

The tube 24 is supported by and is biased upwardly so that normally (when the hotplate is not loaded by a cooking vessel) the cap 23 lies above the cooking plane of the heating elements 13 and 14 by a helical compression spring 48 having its upper end bearing against a metallic flange 49 attached to the tube 24 and its lower end bearing against the bottom of the reflector bowl 19. The shells 47 at their lower ends are secured together by means of blocks of heat insulating material 50, and these blocks are attached to a plate 51; the plate 51 is biased upwardly by springs 52 (shown more clearly in Fig. 3) which are lanced from the material of which the flange 49 is made and which project upwardly to bias the shell assembly 47 upwardly. The springs are arranged to bias these shells so that their upper ends lie in a plane above the top surface of the cap 23 when the heating unit is unloaded. It will be observed that the assembly of the shells 47 and their supports 50 and 51 merely rest upon the springs 50 so that this assembly may be removed as a unit and cleaned if it is desired to do so.

Surrounding the assembly of the tubes 24 and 47 and their supporting means, and in spaced relation with respect to these elements is a metallic tube 53; the upper end of this tube is below the level of the cooking plane, and its lower end is flared outwardly and secured to the reflector bowl 19.

It will be understood that when a cooking vessel is placed on the heating unit it first will engage the tube series 47 and depress it against the force of the springs 52 and then will engage the cap 23 and depress the tube 24 along with the shells 47 against the force of the spring 48, whereby the cap 23 is firmly pressed against the bottom of the cooking vessel and so also will the shells 47. The cooking vessel, therefore, constitutes a thermal "ground" so to speak of high heat capacity for the metallic shells 47 and hence, functions to drain heat from them, which heat is radiated to them from the high temperature heating elements 13 and 14, and thereby prevents an undue rise in the temperature within tube 24.

The selector switch 7 may be of any suitable type, but preferably it will be of the type described and claimed in the U. S. patent to C. P. Randolph et al., No. 2,203,236, dated June 4, 1940. Briefly, this switch comprises a series of flexible contact fingers 54, 55, 56, 57, 58, and 59 fixed at one end, their lower ends as viewed in Figs. 4 to 8, to an electrically insulating housing (not shown) and at their upper ends carry contacts which coact with fixed contacts 60, 61, 62, 63, 64 and 65 respectively, mounted in the housing. It will be understood, and as fully described and explained in the Randolph patent, the contact fingers 54 to 59 are operated by means of a suitable rotary cam (not shown and rotated by knob 7) so as to move into and out of engagement with their respective contacts 60 to 65 in a predetermined order as knob 7 is rotated. Since the details of this construction form no part of this invention, it is not believed necessary to describe it in greater detail here. It is pointed out, however, that contact fingers 54 and 59 have their own individual terminals, while contact fingers 55 and 56 have a common terminal and fingers 57 and 58 have a common terminal, all as shown in Figs. 4 to 8. Fixed contacts 60, 61, 64 and 65 have their individual terminals, while fixed contacts 62 and 63 have a common terminal.

The terminals of spring fingers 54 to 59 and the terminals of fixed contact 60 to 65 are connected to a three-wire supply source indicated by the numerals 66, 67 and 68 (the voltage across the two outside wires 66 and 67 being substantially double that across each of these outside wires and the neutral wire 68, the higher voltage preferably being 230 and the lower 115), and also to the heating elements 13 and 14 and to the temperature responsive control element 20, as shown in Fig. 4. As there shown, one terminal of the heating element 13 is connected to the common terminal of the switch fingers 55 and 56; a terminal 68a, common to the two heater elements 13 and 14, is connected to the fixed contact 60; and the remaining terminal of the heating element 14 is connected to the common terminal for the fixed contact 62 and 63; finger 54 is connected to the outside supply wire 66; fingers 57 and 58 to the outside supply wire 67, and finger 59 to the neutral supply wire 68; fixed contact 61 is connected to the spring finger 34 of the control element 20; fixed contacts 62 and 63 are connected to the spring finger 33 of element 20; fixed contact 64 is connected with one end of the electromagnet coil 44; and fixed contact 65 is connected with switch finger 35 of the control element 20, all as clearly shown in Fig. 4.

In the operation of the specific embodiment of the invention shown in the drawings, it is contemplated that switch 7 will effect two manually controlled heats (manually controlled in the sense that when either heat is set the heating elements will deliver the corresponding heat continuously and without being effected by the operation of the control element 20), and two automatically controlled heats wherein in each case the maximum heat capacity of the elements 13 and 14 is delivered and thereafter when the thermal element 20 operates, a lower cooking heat is delivered depending upon the setting of the switch 7.

To effect the highest heat output under manual control, the switch 7 is operated from its "Off" position of Fig. 4 to its "Manual high" position of Fig. 5. This operation connects the two heating elements 13 and 14 in parallel across the outside wires 66 and 67, that is to the high voltage side of the supply source, by a circuit which may be traced from the outside wire 66 through the switch finger 54 and closed contact 60, terminal 68a of the heating elements, thence through heating element 13 and contact fingers 56 and 57 to the other outside wire 67; and from heater terminal 68a through heater element 14, contact 63 and switch finger 57 to the supply wire 67. It will be obvious here that the thermal element 20 is out of the heating system and hence its operation will have no effect upon the heat delivered by the elements 13 and 14.

Lower manual heat, designated "Manual second," is effected by operating the switch 7 to its position of Fig. 6. This operation functions to connect the heater element 14 only across the outside wire 66 and 67, the heating element 13 being deenergized; this circuit may be traced from the outside wire 66, through the switch finger 54, fixed contact 60, heater element 14 and thence through fixed contact 63 and switch finger 57 to the outside supply wire 67.

To effect the first automatic heat wherein the maximum output of heat is delivered initially to bring the cooking pot quickly to its cooking temperature, and wherein the heat then is cut down to a lower cooking heat but which is still higher than the lowest cooking heat delivered, the switch 7 is moved to its "Automatic high to third" position of Fig. 7. This operation of the switch first connects the two heater elements 13 and 14 in parallel to the two outside wires 66 and 67, but also connects the control element 20 into the control system. Thus, when the switch is in its position of Fig. 7 the heater element 13 is connected across the outside wires 66 and 67 by a circuit which is traced from outside wire 66 through switch finger 54, switch contact 60, heater terminal 68a, heater element 13, switch finger 55, switch contact 61, finger 34 of control element 20, closed contacts 29 and 27, finger 32, magnet coil 44, all of element 20, and switch contact 64 and switch finger 58 to supply wire 67; heater element 14 also is connected to these wires 66 and 67 by a circuit which may be traced from supply wire 66, through switch finger 54, switch contact 60, heater terminal 68a, heater element 14, contact finger 33 of element 20, closed contacts 28 and 29 of this element, and contacts 29 and 28 thereof, finger 34 of this element, closed contact 29 and 27, contact finger 32 and coil 44, and thence through switch contact 64 and switch finger 58 to the outside supply wire 67.

The heater elements 13 and 14 are thus energized in parallel to the outside wires and therefore will deliver the maximum heat. This condition will persist until the heated vessel and hence the bimetallic bar 21 is heated to the cooking temperature. When this temperature has been obtained the bar 21 will have set up therein sufficient stress to move it to the left with a snap action against the force of magnet 37 coacting with armature 38, and when this occurs, it will open the contacts 38 and 39 and contact 28 and will close contacts 30 and 31.

Here it is to be observed that when the heater elements 13 and 14 are connected in parallel to the outside wires 66 and 67 by the circuits described above, the heater current will flow through the electromagnet coil 44 of element 20. This coil, therefore, will energize electromagnet 42 and pull the spring contact arm 35 toward the left, that is, it moves the contact 31 toward the left away from contact 30. The purpose of this is to delay the making of contacts 30 and 31 following the breaking of contacts 27 and 28 and 29 so as to assure that any arc between the latter sets of contacts is broken before the contacts 30 and 31 are brought into engagement, thereby protecting the device against a short circuit without the use of special relays; it will be observed that the circuit through the coil 44 will be complete and, hence, the magnet 42 energized as long as any arc between contacts 27 and 28 and 29 is maintained. Once this arc is extinguished, the magnet will be deenergized and the contact 31 will be returned by the resiliency of arm 35 to its position for engagement with contact 30.

The operation of the control element 20 in closing the contacts 30 and 31, transfers the heater elements 13 and 14 from the high voltage of the two outside wires 66 and 67 to the low voltage of the outside wire 66 and the neutral wire 68. The circuit for the heater 13 may be traced from the outside wire 66 through switch finger 54, switch contact 60, heater terminal 68a, heater element 13, switch finger 55, switch contact 61 and thence through switch finger 34 of element 20, its contact 30 and associated contact 31, switch finger 35 of element 20 and thence through contact 65 and finger 59 of switch 7 to the neutral wire 68. The energizing circuit of element 14 may be traced from the outside wire 66, through switch finger 54, contact 60, heater terminal 68a, heater element 14, contact 62 of switch 7, fingers 56 and 58 of switch 7, contact 61 of switch 7, and thence through the elements 34, 30, 31 and 35 of the control element 20, and finally through switch 7, contact 65 and switch finger 59 to the neutral wire 68. In other words, merely by setting the control switch 57 to Fig. 7, the maximum degree of heat is generated until the bimetal bar 21 moves toward the left, which operation automatically connects the two heater elements for a lower cooking heat.

Still a further lower cooking heat following the maximum degree of heat generated for quick heating is had automatically by moving the control switch 7 to its "Automatic high to fourth" position of Fig. 8. The operation of the control switch to this position first connects the two heaters 13 and 14 in parallel to the outside wires 66 and 67. This operation connects the heater 13 across the outside wire 66 and 67 by a circuit which may be traced from the outside wire 66 and the elements 54 and 60 of switch 7, heater terminal 68a, heater 13, and elements 55 and 61 of switch 7, thence through elements 34, 29, 27, 32 and 44 of control element 20, and finally through switch 7 elements 64 and 58 to the wire 67. Heater element 14 is energized from outside wire 66 through elements 54 and 60 of switch 7, heater terminal 68a, heater 14, and through elements 33, 28, 29, 27, 32 and 44 of control element 20, and finally through elements 64 and 58 of switch 7 to the outside wire 67.

Here, however, when the thermostat 21 responds to the cooking vessel attaining the cooking temperature and operates to open contacts 28 and 29 and 27 and 29 and to close contacts 31 and 30, the heating element 13 only is energized and it is energized on the low voltage across the outside wire 66 and the neutral wire 68. This circuit for heating element 13 may be traced from the outside wire 66 through the elements 54 and 60 of switch 7, heater terminal 18a, heater element 13, switch elements 55 and 61, elements 34, 30, 31 and 35 of control device 20, and thence through switch 7 elements 65 and 59 to the neutral wire 68.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electric hotplate, an electric heating element lying in a horizontal plane for heating a cooking vessel placed upon it and encircling a central area, means for automatically controlling said heating element comprising a switch for controlling the energization of said heating element, a thermostatic element for operating said switch located in said central area and engageable by said cooking vessel so that it responds to the temperature thereof, resilient means biasing said thermostatic element to a normal position above the plane of said heating element and yielding when the cooking vessel is placed on said heating element so as to force said thermostatic element into good thermal relation with said cooking vessel, and heat baffle means in said central area horizontally surrounding said thermostatic element and interposed between said thermostatic element and said heating element to shield said thermostatic element from radiant heat from said heating element, and spring means biasing said baffle means to extend above the plane of said heating element so that said baffle means is engaged by said cooking vessel when placed on said heating element and said last-named spring means yields to insure good thermal conductivity between said baffle means and said cooking vessel.

2. In an electric hotplate, an electric heating element lying in a horizontal cooking plane and encircling a central area and adapted to support a cooking vessel thereon, a switch for controlling the energization of said heating element, a thermostat for operating said switch located in said central area, a heat conducting cap in thermal contact with said thermostat, cylindrical heat shields within said central area surrounding said thermostat to shield it from radiant heat from said heating element, and biasing means resiliently biasing said cap and shields separately upwardly so that normally they project above said plane, said biasing means yielding to the weight of a cooking vessel placed on said heating element thereby to force said cap and shields into good heat conducting relation with the bottom wall of said vessel when it is placed thereon.

3. In an electric hotplate, an electric heating element lying in a cooking plane and encircling a central area and adapted to support a cooking vessel thereon, a switch for controlling the energization of said heating element, a thermostat for operating said switch located in said central area, a heat conducting cap in thermal contact with said thermostat, a heat insulating tube in said central area housing said thermostat and supporting said cap at its upper end, spring means biasing said tube upwardly so that the upper surface of said cap normally lies above said cooking plane, a tubular heat shield in said central area in concentric relation with said tube to shield it from radiant heat from said heating element, a support on said tube supporting said heat shield for separation thereof from said hotplate, and second spring means on said support biasing said shield upwardly so that its upper end lies above said cooking plane, both of said spring means yielding to the weight of a cooking vessel placed on said hotplate so as to force said cap and shield into good heat conducting relation with said vessel.

LLOYD T. AKELEY.

REFERENCES CITED

The following references are of record in the file of this patent:

UNITED STATES PATENTS

| Number | Name | Date |
|---|---|---|
| 1,528,045 | Butcher | Mar. 3, 1925 |
| 1,888,856 | Fuller | Nov. 22, 1932 |
| 2,196,151 | Johnson | Apr. 2, 1940 |
| 2,207,634 | Myers et al. | July 9, 1940 |
| 2,288,510 | Brannon | June 30, 1942 |
| 2,303,012 | Weber et al. | Nov. 24, 1942 |
| 2,311,087 | Sandell | Feb. 16, 1943 |
| 2,399,423 | Bletz | Apr. 30, 1946 |
| 2,410,014 | Clark | Oct. 29, 1946 |
| 2,424,412 | Myers | July 22, 1947 |
| 2,427,945 | Clark et al. | Sept. 23, 1947 |